United States Patent [19]

Kawakami et al.

[11] 4,236,432
[45] Dec. 2, 1980

[54] FRET SAW BLADE HAVING SAW-TEETH PROVIDED WITH SETS AND AN AUTOMATIC FRET SAWING MACHINE HAVING THE FRET SAW BLADE

[75] Inventors: Hideo Kawakami; Masami Endo, both of Numazu; Fumio Yamazaki, Fuji, all of Japan

[73] Assignee: Toshiba Kikai Kabushiki Kaisha, Tokyo, Japan

[21] Appl. No.: 941,173

[22] Filed: Sep. 11, 1978

[30] Foreign Application Priority Data

Sep. 17, 1977 [JP] Japan .................................. 52-111952

[51] Int. Cl.³ .............................................. B27B 19/10
[52] U.S. Cl. .......................................... 83/848; 83/71; 83/747; 83/835
[58] Field of Search ......................... 83/835, 848–855, 83/747, 837, 784, 71; 30/355, 392; 145/31 AB; 76/112, 72, 28, 29

[56] References Cited

U.S. PATENT DOCUMENTS

| 12,664 | 4/1855 | Barlow | 83/854 |
|---|---|---|---|
| 298,886 | 5/1884 | Peak | 83/835 |
| 324,357 | 8/1885 | Brown | 83/855 |
| 1,876,945 | 9/1932 | Hutchings | 83/835 |
| 2,635,652 | 4/1953 | Norquist | 83/855 |
| 3,367,216 | 2/1968 | Anderson et al. | 76/112 |
| 3,371,393 | 3/1968 | Grassmann | 83/855 X |
| 4,116,101 | 9/1978 | Kawakami et al. | 83/784 X |

FOREIGN PATENT DOCUMENTS 1396820  3/1965  France ........................................ 83/835

*Primary Examiner*—J. M. Meister
*Attorney, Agent, or Firm*—Koda and Androlia

[57] ABSTRACT

In a fret saw blade having a shank portion and saw-teeth, the saw-teeth are formed in a manner that the centers of the cutting edges of some saw-teeth are depressed and deformed generally in V-shape so as to form sharp ends projecting beyond the side surfaces of the shank portion of the fret saw blade.

1 Claim, 24 Drawing Figures

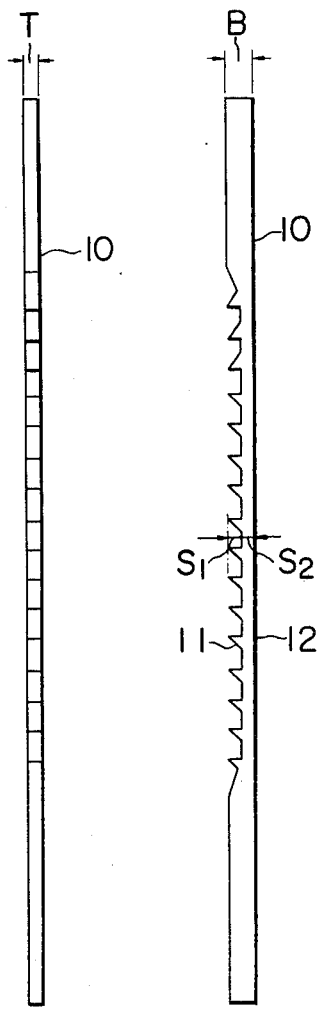
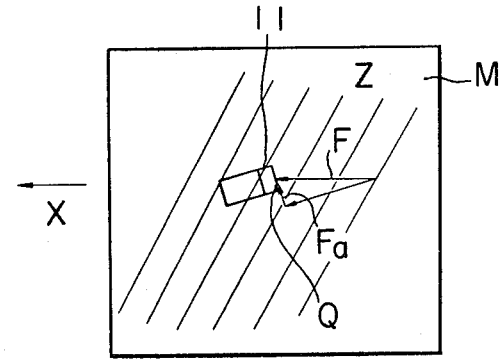
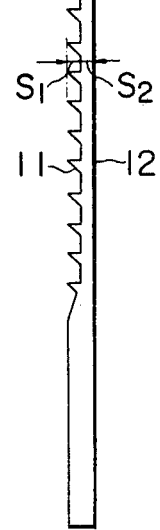
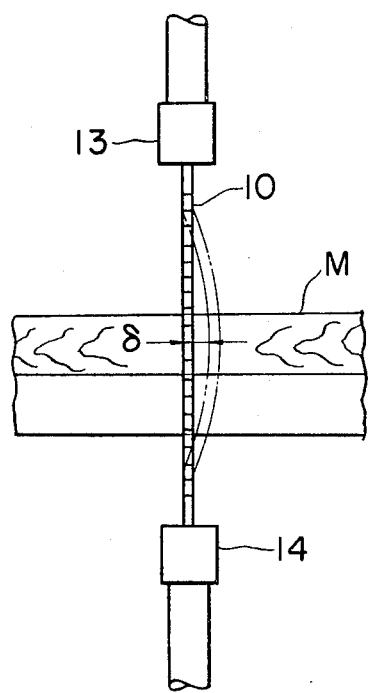

FIBER ORIENTATION (1P, 3P, 5P, 7P, 9P)

(2P, 4P, 6P, 8P)

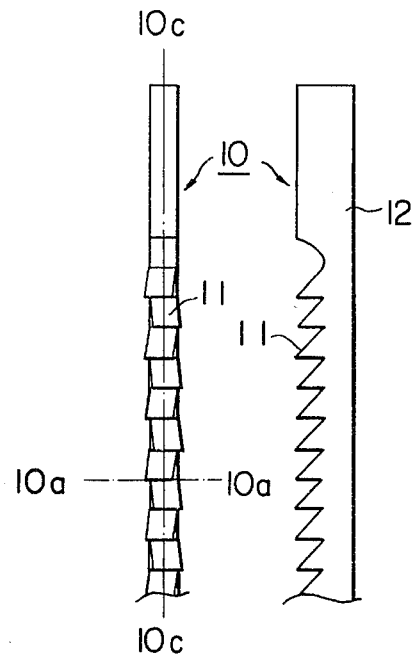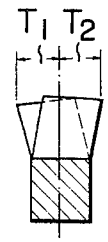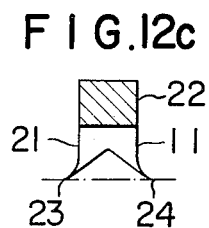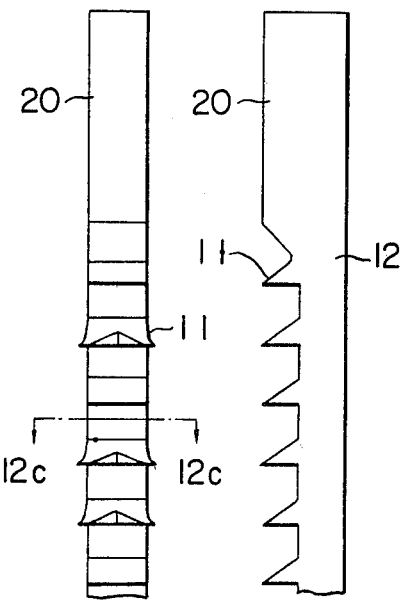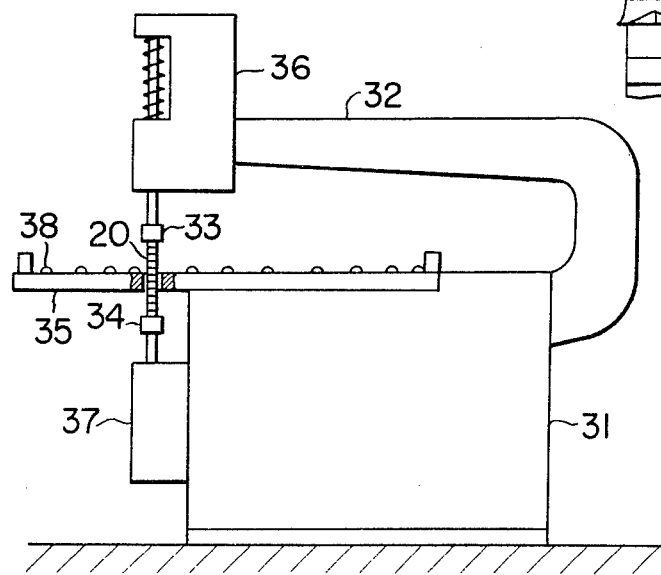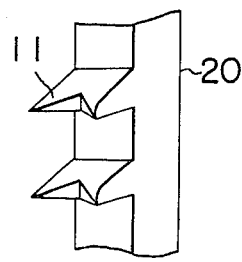

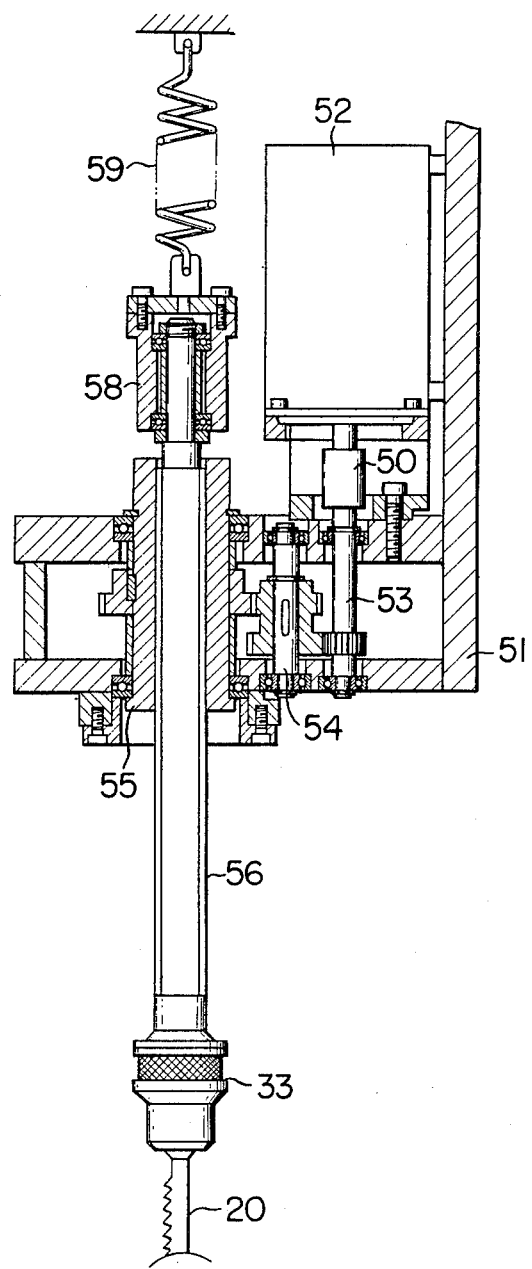
F I G. 15

FRET SAW BLADE HAVING SAW-TEETH PROVIDED WITH SETS AND AN AUTOMATIC FRET SAWING MACHINE HAVING THE FRET SAW BLADE

BACKGROUND OF THE INVENTION

This invention relates to a fret saw blade and an automatic fret sawing machine provided with the fret saw blade.

It is well known in the art to cut grooves along lines preliminarily described on workpieces, particularly wood plates or plastic plates, by reciprocating a fret saw blade in its longitudinal direction, and in such a machine, an operator supports and feeds the workpiece by hands so that the workpiece is cut by moving the fret saw blade along the line described on the workpiece.

Recently, due to shortage of skilled operators and application of numerically controlled machine tools to wood working fields, it has been proposed to automate the feeding of the workpiece, the rotation of the fret saw blade, and the clamping or removing of the ends of the blade by clamping members. However, in these machines, the fret saw blade itself has not been improved and a conventional one has been used.

FIGS. 1a and 1b show one example of conventional fret saw blades, and the fret saw blade 10 shown therein comprises a plurality of spaced apart saw-teeth 11 each having a width T which corresponds to the width of the shank 12 of the fret saw blade 10 and this width T determines the width of the groove of a workpiece to be cut. The thickness $S_2$ of the shank 12 (where the thickness B of the blade 10 = the height $S_1$ of a saw-tooth 11 + $S_2$) is predetermined so that the fret saw blade will have a certain stiffness for resisting the reaction force created when a groove is cut and for sufficiently bearing the tension acting on the fret saw blade in its longitudinal direction and created when the workpiece is cut.

In the case where the conventional fret saw blade shown in FIGS. 1a and 1b is applied to an automatic fret sawing machine in which the feeding of the workpiece, the rotation of the fret saw blade, and the clamping of the ends thereof are automated, it was found that the following problems exist.

In a profile controlled or numerically controlled automatic fret sawing machine, clamping members of the fret saw blade are angularly controlled so that the fret saw blade will be moved linearly or tangentially in accordance with the shape of a straight or curved line depicted on the workpiece to be cut which is predetermined by programmed profile information. However, it was found that the acutally cut groove somewhat deviates from the desired line in the course of the cutting operation in spite of the angular control of the clamping members, as shown in FIG. 2 wherein line $\overline{AB}$ is a desired line and line $\overline{AB'}$ is an actually cut line. This is because the direction of advance of the fret saw blade is affected by the fiber orientation of the workpiece such as a wood plate or bamboo plate. This fact will be explained hereunder in conjunction with FIGS. 3 and 4.

In FIG. 4, clamping members 13 and 14 rigidly clamp the upper and lower ends of the fret saw blade 10, and although the clamping members 13 and 14 can be controlled to direct the fret saw blade to the correct feeding direction by means of a profile control or numerical control system, the blade 10 is gradually directed to the fiber orientation Z of the workpiece M during the cutting thereof (shown in FIG. 3). When the workpiece M is fed in the direction of X as shown in FIG. 3, although the fret saw blade 10 is at first disposed in parallel to the direction X, it is then subjected to a feeding force F which creates a cutting resistance, and a component force Fa of this cutting resistance F acts upon the lower side (as viewed in FIG. 3) of the fret saw blade 10 because of the fiber orientation of the workpiece, the orientation being illustrated as oblique lines in FIG. 3. Thus, the fret saw blade 10 is inclined by the component force Fa and is deflected by δ in the direction normal to the direction of feeding the workpiece as shown in FIG. 4. The deflection δ of the fret saw blade 10 causes that the profile which is formed after cutting the workpiece will not coincide with the desired profile based on the programmed instructions. However, this deflection δ does not exceed a certain extent because of a restoring force generated by the increase in the twisting stress and the bending stress of the blade 10 caused by the increase in the deflection δ and because of a set effect of a saw-tooth of the blade 10 at the corner portions Q thereof when the blade is inclined with respect to the direction of feeding of the workpiece M. In our experiment, the deflection δ reached 2–3 mm with respect to a fret saw blade having a width of 0.7 mm. If the fret saw blade were used under the deflected condition, the blade would be broken by the repeated bending stress and the frictional heat generated at the contacting surface between the side surfaces of the fret saw blade 10 and the workpiece M to be cut, and even when a guide 15 is used as shown in FIG. 5, the blade would be broken by the repeated bending stress and the frictional heat at the contacting surface between the guiding surface of the guide 15 and the blade 10. Furthermore, where a cut groove K is not formed vertically to the surface of the workpiece as shown in FIG. 6 when the fret saw blade is used under the bent condition, and if such a cut groove K as shown in FIG. 6 is used as a groove for a cutting blade for use in die making, it is impossible to produce a product with high quality.

In our further experiment, a nine-ply plywood having a thickness of 18 mm which is used for the die making was used and a fret saw blade shown in FIG. 1 was also used to observe how the fret saw blade would be deflected by the fiber orientation of the workpiece to be cut.

FIG. 7a shows a pattern according to which above described plywood is cut radially at a spacing of 15° in the X-Y plane in which $h_1$ through $h_{24}$ and $H_1$ through $H_{24}$ are holes for inserting the fret saw blade 10 to start the cutting of the grooves, and dotted lines interconnecting inner and outer holes represent lines to be cut by programmed instructions. The fret saw blade starts to cut the groove from an inner hole along the dotted line to an intermediate point $P_1$, for example, and then from an outer hole to the intermediate point $P_1$. However, for example, as to the line connecting $h_1$ to $H_1$, an actually cut groove does not coincide with the predetermined line connecting $h_1$ to $H_1$ through $P_1$ as shown in FIG. 7b for the reason described hereinafter.

FIG. 8a shows one example of a plywood having nine plies which are laminated such that the fiber orientations of odd-numbered plies are substantially perpendicular to the fiber orientations of even-numbered plies, and it is presumed that the fiber orientations substantially correspond to Y and X axes of rectangular coordinates respectively as shown in FIGS. 8b and 8c.

In the case where such a plywood is cut as shown in FIG. 7a, although the following is not absolutely correct because the fiber orientations are not always disposed uniformly, it was found that the deviation of an actually cut line from the predetermined line to be cut reaches a maximum value at angles of 15°, 75°, 105°, 165°, 195°, 255°, 285° and 345°, reaches an intermediate value at 30°, 60°, 120°, 150°, 210°, 240°, 300° and 330°, and reaches a minimum value at 0°, 45°, 90°, 135°, 180°, 225°, 270° and 315° in the rectangular coordinates in which the line $h_{12}$-$H_{12}$ ($h_{24}$-$H_{24}$) corresponds to the X-axis and the line $h_6$-$H_6$ ($h_{18}$-$H_{18}$) corresponds to the Y-axis. The reason why such various deflections of the cut lines are caused will be described hereunder.

FIG. 9 shows an ideal lattice-like modeled pattern of the fiber orientations of the plywood. It will be understood that when the cutting operation starts from the center of the plywood in a radial direction, the fret saw blade 10 is affected and deflected by the fiber orientation in the direction of X in the shaded area in FIG. 9 and by the fiber orientation in the direction of Y in the area not shaded respectively. Accordingly, the cutting lines $h_1$-$P_1'$ and $H_1$-$P_1''$ do not coincide with lines $h_1$-$P_1$ and $H_1$-$P_1$ as shown in FIG. 7b.

Usually when a pattern depicted on the surface of a workpiece such as a wood plate is cut by using a jig saw, the cutting operation has been performed while observing and correcting the deviation between the actually cut line and the preliminarily designated profile by manually controlling the feeding of the workpiece. However, some of automatical fret sawing machines which are operated by a profile control or numerical control device have not a function of controlling the deviation and although an automatic fret sawing machine provided with a controlling mechanism correcting the deviation may be technically possible, such machine is expensive and not economical.

Furthermore, recently, there has been proposed a fret saw blade 10 having saw-teeth 11 with alternate sets of teeth offset transversely as shown in FIGS. 10a and 10b.

Although such fret saw blade 10 is advantageous to cut a metal workpiece, it is useless for cutting a workpiece having elasticity such as a wood plate or bamboo plate for the reason that in the cutting operation of these fibrous materials, when the cutting quality is lowered, the elastic deformation degree of the portion of the workpiece engaging the fret saw blade and the elastic restitution degree at the cut groove of the workpiece after the cutting are larger than those in the case where the fret saw blade has a good cutting quality. For this reason, the width of the cut groove is reduced, and the reduction and the nonuniformity of the width of the cut groove make it improper to put a cutting blade for use in die making in the groove. Moreover, it is difficult to make the edge line 10a-10a of a saw-tooth to be precisely perpendicular to the axis $10_c$-$10c$ of the fret saw blade 10 and to accurately set the dimension of the sets of the saw-teeth so as to be bilaterally symmetrical (i.e. $T_1 = T_2$) as shown in FIG. 11, and the whole fret saw blade tends itself to be offset with respect to its longitudinal axis. Therefore, as far as an automatic fret sawing machine which uses a fret saw blade provided with such sets of the saw-teeth as shown in FIGS. 10a, 10b is concerned, it is almost difficult to cut a groove coinciding with a predetermined line to be cut, and more particularly, circles cut clockwisely and anti-clockwisely in accordance with the same programmed instructions would have different diameters. Thus, it is impossible to use a conventional fret saw blade provided with sets of the saw-teeth for an automatically controlled fret sawing machine. Furthermore, it is required that the conventional fret saw blade is provided with an even-number of sets engaging the workpiece in cutting operation to balance the cutting line.

SUMMARY OF THE INVENTION

Accordingly, an object of this invention is to provide a fret saw blade provided with sets of saw-teeth having improved construction for removing defects of a conventional fret saw blade.

Another object of this invention is to provide an automatic fret sawing machine having an improved fret saw blade.

According to this invention these objects are performed by providing a fret saw blade comprising a shank and saw-teeth which is characterized in that the saw-teeth are formed such that the center of the cutting edges of some of the saw-teeth are deformed so as to form sharp ends projecting beyond the side surfaces of the shank of the saw blade.

BRIEF DESCRIPTION OF THE DRAWINGS

In the accompanying drawings:

FIG. 1a is a front view of one example of a conventional fret saw blade;

FIG. 1b is a side view of the fret saw blade shown in FIG. 1a;

FIG. 2 shows a deviation between a desired line to be cut and an actually cut line;

FIG. 3 is a view explaining the force acting upon the fret saw blade to cause it to deflect;

FIG. 4 shows a deflected condition of the fret saw blade;

FIG. 7a is a view showing the relationship between desired radial lines to be cut and actually cut lines by using the fret saw blade shown in FIG. 1a;

FIG. 7b is an enlarged view of one cut line of FIG. 7a;

FIG. 9 shows a modeled pattern of the fiber orientations of the plywood shown in FIG. 8a;

FIGS. 10a and 10b are front and side views respectively of the other one of conventional fret saw blades having saw-teeth provided with sets;

FIG. 11 is an enlarged cross sectional view of a portion of the saw-teeth shown in FIG. 10a;

FIGS. 12a and 12b are front and side views respectively of a fret saw blade according to this invention;

FIG. 12c is a cross sectional view taken along the line 12c—12c of FIG. 12a;

FIG. 12d is an enlarged perspective view of a portion of the saw-teeth provided with sets of the fret saw blade shown in FIG. 12a;

FIG. 13 is a schematic side view of an automatic fret sawing machine provided with a fret saw blade according to this invention;

FIG. 15 is a cross sectional view of a rotating mechanism of the fret sawing machine shown in FIG. 13.

DESCRIPTION OF THE PREFERRED EMBODIMENT

Figure 5:
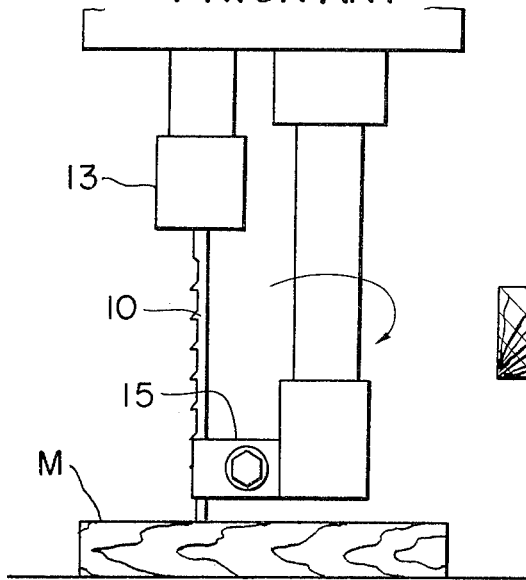
FIG. 5 is a schematic view showing a guide applied to the fret saw blade.
Figure 6:
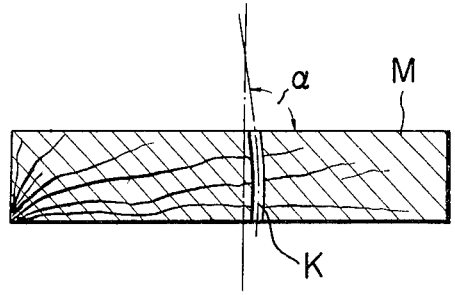
FIG. 6 is a vertical sectional view of a workpiece as viewed from the lefthand side of FIG. 5.
Figure 7A:
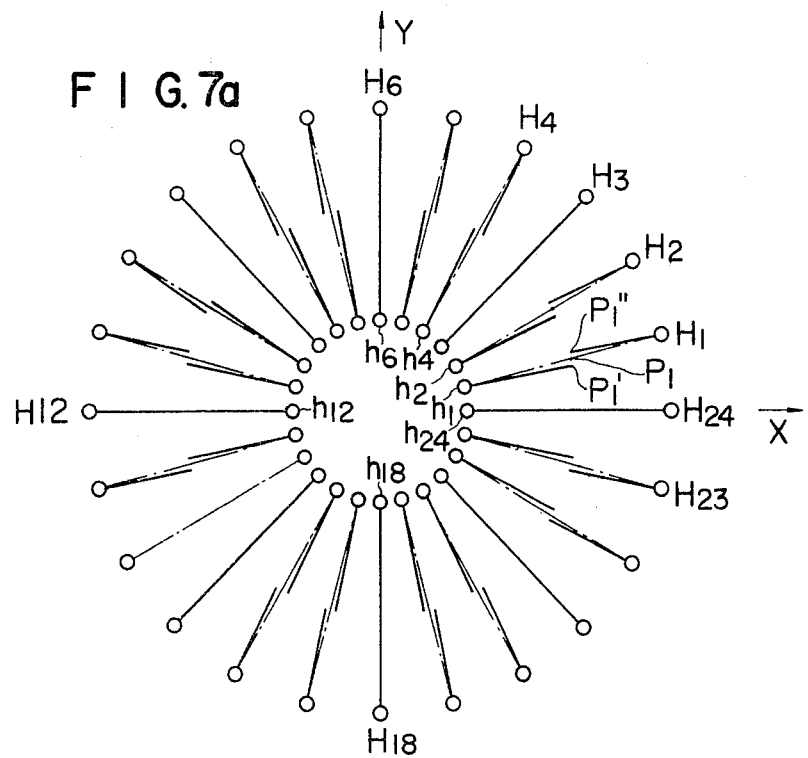
Figure 7B:
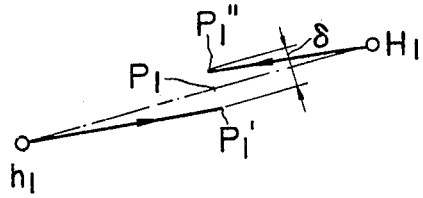
Figure 8A:
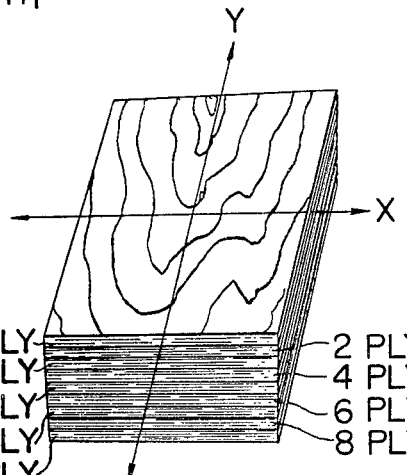
FIG. 8a shows a plywood consisting of nine laminated plies.
Figure 8B:
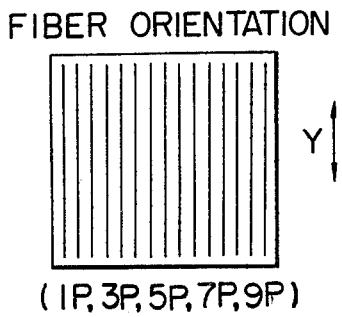
FIGS. 8b and 8c show fiber orientations of odd-numbered plies and even-numbered plies, respectively.
Figure 8C:
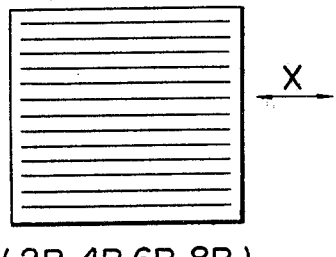
Figure 9:
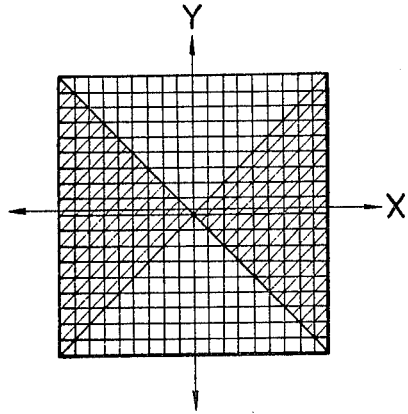

Referring to FIGS. 12a through 12d, the edge of each saw-tooth 11 of a fret saw blade 20 is deformed to form a V-shaped groove by depressing the center portion of the cutting edge as shown in FIG. 12d by suitable means. The both ends 23 and 24 of thus deformed cutting edge of the saw-tooth 11 are sharply tapered and projected beyond the side surfaces 21 and 22 of the shank of the blade so as to provide sets for the saw-tooth of the fret saw blade.

Although a plurality of these V-shaped saw-teeth are provided for the fret saw blade, all saw-teeth 11 are not provided with such V-shaped grooves for the reason that if all saw-teeth are formed in V-shape, capability for cutting a workpiece by vertically reciprocating the fret saw blade is lowered. Therefore, it is desired to form V-shaped grooves for a suitable number of saw-teeth. For example, in our experiment, it was found that it is advantageous to alternately arrange one saw-tooth having no set and two saw-teeth each provided with sets.

FIG. 13 is a schematic side view of an automatic fret sawing machine provided with the fret saw blade according to this invention wherein the fret saw blade 20 is clamped by upper and lower clamping members 33 and 34. The upper clamping member 33 is operatively connected to an upper driving head 36 mounted on the front end of an arm 32 attached to a bed 31 and the lower clamping member 34 is also connected to a lower driving head 37.

An electric motor and driving means for vertically reciprocating the fret saw blade 20 are connected to each of the driving heads 36 and 37, and each driving means includes a timing belt and a link mechanism (not shown). Also, in each head there is housed a pulse motor for synchronously rotating the clamping members 33 and 34, and pulses having the same phases are applied to the pulse motors respectively from one pulse generating means (not shown). A table 35 is mounted on the bed 31 and a plurality of wheels 38 are disposed on the upper surface of the table 35 so that the workpiece can easily be moved on the table 35.

Figure 14:
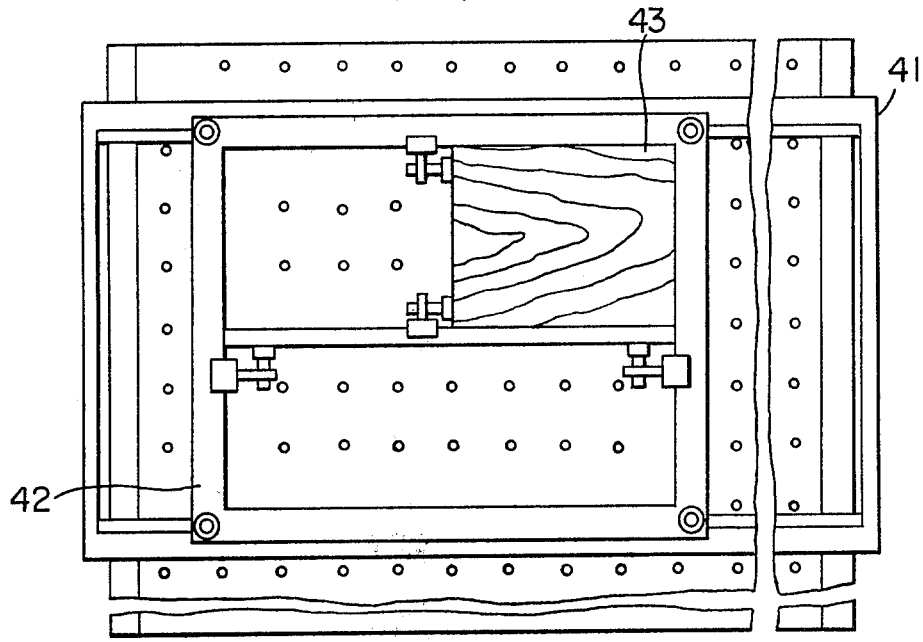
FIG. 14 is a plan view of a workpiece to be cut and a movable frame for supporting the workpiece.

FIG. 14 shows frames 41 and 42 movable in X and Y directions respectively on the table 35 and the workpiece 43 is fixed clamped by the frame 42.

FIG. 15 shows a rotating mechanism, housed in the driving head 36, and including a pulse motor 52 attached to a stationary frame 51 for rotating the fret saw blade. The output shaft of the pulse motor 52 is connected to a shaft 53 through a coupling 50. The rotation of the shaft 53 is transmitted to a male spline shaft 56 through a gear train, a shaft 54 and a female spline shaft 55, whereby the clamping member 33, i.e. the fret saw blade 20, is rotated. The male spline shaft 56 is moved up and down by a cylindrical member 58 (connected to a link mechanism (not shown)). A tension spring 59 is connected to the male spline shaft 56 so as to pull it upwardly, whereby a tension is imparted to the fret saw blade 20 to minimize the deflection of the blade and if the blade 20 is accidentally broken, the broken blade is easily pulled upwardly.

Figure 16:
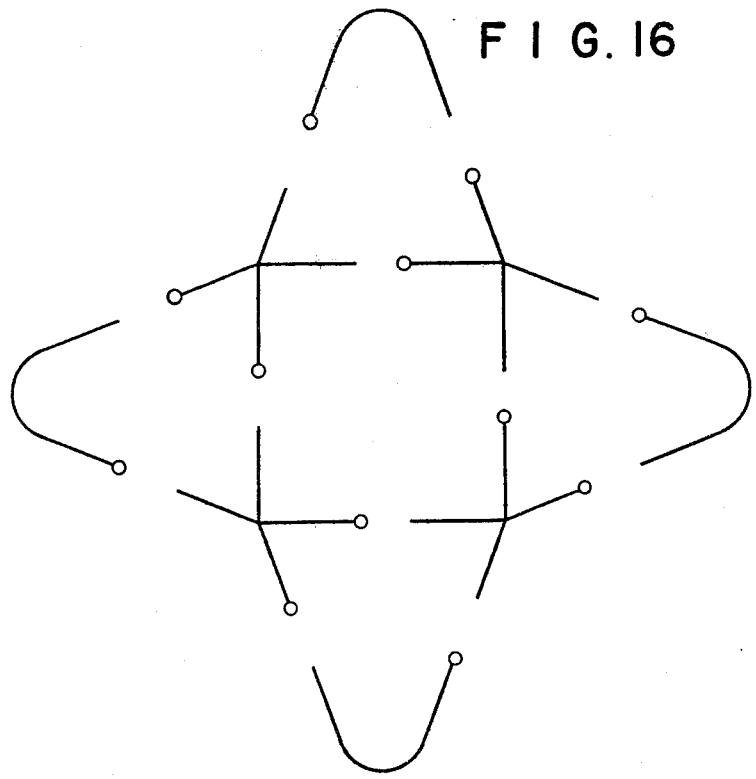
FIG. 16 shows one pattern of grooves cut by the automatic fret sawing machine provided with the fret saw blade according to this invention.

FIG. 16 shows one pattern of grooves cut by the automatic fret sawing machine having the fret saw blade according to this invention.

The advantages obtained by this invention can be summarized as follows.

Since the fret saw blade according to this invention has several saw-teeth provided with sets specifically formed as V-shaped saw-teeth, the sharp edges of the V-shaped saw-teeth cut effectively orientated fibers of the workpiece and the fret saw blade is not substantially deflected during the cutting operation, and it is possible that the fret saw blade is prevented from accidentally breaking in the cutting operation. Accordingly, the width of the cut groove is substantially uniform throughout its length and a circular corner groove can be cut having a radius of curvature less than one half of that of a groove cut by a conventional fret saw blade. Furthermore, since two sets are formed at both ends of the cutting edge of one saw-tooth of the fret saw blade, the deflection of the blade resulted from the fiber orientation of the work-piece is less than that of the conventional fret saw blade such as shown in FIGS. 10a and 10b, and the width of the saw-tooth can presicely measured and set. Thus, when the fret saw blade according to this invention is applied to an automatical fret sawing machine, the cut groove can be formed accurately in accordance with the preliminarily programmed instructions and the groove cut by fret saw blade is particularly suitable for use in die making.

Although in this specification, saw-teeth were shown as provided with V-shaped grooves, the other shape of the groove is possible if the ends of the cutting edge of the deformed saw-tooth is sharply projected beyond the side surfaces of the shank of the fret saw blade.

What is claimed is:

1. In a fret saw blade used for a numerically controlled automatic fret sawing machine and adapted to cut wood material, said fret saw blade having a shank, saw-teeth having non deformed cutting edges and at least one saw-tooth having a cutting edge the center of which is deformed to form sets, the improvement in which the cutting edge of said deformed saw-tooth is constructed to have a V-shaped groove extending substantially the full width of the saw tooth in order to form narrow sharp ends at both ends of the V-shaped groove projecting substantially horizontally beyond the side surfaces of said shank, whereby said fret saw blade can cut a wood material along a predetermined profile by preventing the deviation of said saw blade caused by fiber orientation of the wood material from said profile.

* * * * *